United States Patent
Verbil et al.

(10) Patent No.: US 7,145,905 B2
(45) Date of Patent: Dec. 5, 2006

(54) CALL QUEUING SERVICE TERMINATION

(75) Inventors: John M. Verbil, Scottsdale, AZ (US); Martin R. Marks, Phoenix, AZ (US)

(73) Assignee: Qwest Communications International Inc., Denver, CO (US)

( * ) Notice: Subject to any disclaimer, the term of this patent is extended or adjusted under 35 U.S.C. 154(b) by 771 days.

(21) Appl. No.: 09/797,242

(22) Filed: Mar. 1, 2001

(65) Prior Publication Data

US 2001/0007556 A1    Jul. 12, 2001

Related U.S. Application Data

(63) Continuation-in-part of application No. 09/159,940, filed on Sep. 24, 1998, now abandoned, which is a continuation of application No. 08/806,973, filed on Feb. 26, 1997, now Pat. No. 5,844,896.

(51) Int. Cl.
*H04L 12/50* (2006.01)
*H04Q 11/00* (2006.01)

(52) U.S. Cl. .................. 370/385; 370/429; 370/522

(58) Field of Classification Search ............... 370/385, 370/522, 229, 230, 412, 400, 410, 429, 439; 379/67.1, 15.02, 15.03, 15.04, 207.02, 207.03, 379/201.01, 207.1

See application file for complete search history.

(56) References Cited

U.S. PATENT DOCUMENTS

| | | | |
|---|---|---|---|
| 5,440,623 A | 8/1995 | Moore et al. | 379/88.26 |
| 5,610,912 A | 3/1997 | Johnston | 370/359 |
| 5,633,924 A | 5/1997 | Kaish et al. | 379/266.03 |
| 5,652,790 A | 7/1997 | Andruska et al. | 379/230 |
| 5,692,033 A * | 11/1997 | Farris | 379/67.1 |
| 5,696,809 A | 12/1997 | Voit | 379/22.01 |
| 5,701,301 A | 12/1997 | Weisser, Jr. | 370/428 |
| 5,844,896 A | 12/1998 | Marks et al. | 370/385 |
| 5,896,445 A * | 4/1999 | Kay et al. | 379/135 |
| 5,949,869 A * | 9/1999 | Sink et al. | 379/221.05 |
| RE37,001 E * | 12/2000 | Morganstein et al. | 379/67.1 |
| 6,515,964 B1 * | 2/2003 | Cheung et al. | 370/230 |

* cited by examiner

*Primary Examiner*—Brian Nguyen

(74) *Attorney, Agent, or Firm*—Brooks Kushman P.C.

(57) ABSTRACT

Call queuing is implemented in a telecommunications advanced intelligent network. A determination is made that the call has been queued for a determined amount of time. The caller is requested to perform an action to remain in a queue. If the caller does not perform the requested action, the call is dequeued.

4 Claims, 5 Drawing Sheets

CALL QUEUING SERVICE TERMINATION

CROSS-REFERENCE TO RELATED APPLICATIONS

This application is a continuation-in-part of U.S. application Ser. No. 09/159,940, filed Sep. 24, 1998 now abandoned, which, in turn, is a continuation of application Ser. No. 08/806,973, filed Feb. 26, 1997 now U.S. Pat. No. 5,844,896, each of which is incorporated by reference herein.

BACKGROUND OF THE INVENTION

1. Field of the Invention

This invention relates to telecommunications network-based call queuing operations.

2. Background Art

For businesses that receive many phone calls per day, it is common for a telephone company to provide such subscribers with more than a single incoming telephone line on which to receive calls. These multiple lines are commonly configured as a hunt group. The hunt group has a telephone number associated with it which, when dialed, causes a telephone routing system to attempt to connect the call to each of the incoming telephone lines until an idle line is found.

Many businesses also subscribe to voice messaging or queuing services provided by their telephone company. In such systems, if all the telephone lines in the hunt group are busy or go unanswered, the voice messaging system (VMS) generates a computer-activated message instructing the caller to leave a message. The message is then recorded by the voice messaging system and is stored in a computer, thereby allowing subscribers to listen to the recorded messages and call back the customers who were unable to get through. With queuing services, if all the telephone lines in the hunt group are busy, a computer-activated message is similarly generated instructing the caller that all operators are currently busy, and that the call will be answered in the order received.

While the above call handling features have worked well for the majority of call handling situations, they have their drawbacks. Namely, neither feature allows a caller to choose whether to leave a message or to remain on the line while a call is answered. One solution overcomes this problem through use of a switch-based approach. For example, programmable central office switches may provide prioritized features to a telephone number including queuing, Call Forward Don't Answer to the voice messaging system, and Call Forward Busy Line to the voice messaging system. The routing system typically includes a set of incoming telephone lines that are configured as a multi-line hunt group having a Hunt Group Directory Number associated with it. The Hunt Group Directory Number has queuing, Call Forward Line to the VMS and Call Forward Don't Answer to the VMS features enabled. The multi-line hunt group has further associated with it a set of individual hunt group telephone numbers that are matched to each of the incoming telephone lines. Each individual hunt group telephone number has the features Call Forward Busy Line to the VMS and Call Forward Don't Answer to the VMS enabled, but does not have a queuing feature enabled.

While a switch-based approach combines queuing and voice messaging features with existing telephone switching and voice messaging hardware, it does so at a cost which has limited its use to larger business customers. Moreover, because the approach is switch based, it is inapplicable to next generation network system, namely an Advanced Intelligent Network (AIN).

Consequently, a need exists for a system and method which permits residential customers and small to medium sized business customers the ability to place incoming calls in a queue when all of their lines are busy for later retrieval. Such a system and method should obviate the need for a subscriber to purchase telephone lines equivalent to the maximum queue size as well as the hardware needed to provide such queuing function. Subscribers should not be required to purchase any additional telephone lines or hardware to provide the required queuing function. Further, queues should be managed so as not to permit callers to remain in network-based queues. This may happen, for example, if a caller forgets that a queued call is on hold or on speaker.

SUMMARY OF THE INVENTION

The present invention places calls in a network-based queue if a subscriber line is busy. After some time, the caller is requested to perform an action to remain in the queue. If the caller does not perform the requested action, the call is dequeued.

A method of terminating call queuing implemented in a telecommunications advanced intelligent network is provided. A call is placed in a queue implemented within the telecommunications network. A determination is made that the call has been queued for a determined amount of time. The caller is requested to perform an action to remain in a queue. If the caller does not perform the requested action, the call is dequeued.

In an embodiment of the present invention, dequeuing may include routing the call to a messaging system within the telecommunications network, switching the call to another line, terminating the call, and the like.

In another embodiment of the present invention, the determined amount of time may be a preset amount of time, or may be based on a variety of factors including the number of calls in a queue, the time of day, information about the queued call, and the like.

A system for terminating call queuing implemented in an Advanced Intelligent Network is also provided. The network has at least one central office switch and a service control point (SCP) connected with subscriber switches through a signaling network. The system includes an intelligent peripheral in communication with the central office switch and the service control point. The intelligent peripheral is equipped with queuing functionality for each subscriber. The intelligent peripheral places a call to the central office switch for receipt by a subscriber having a call placed in queue in response to a determination that a line associated with the subscriber is idle. The intelligent peripheral requests that the caller perform an action to remain in queue after determining that the call has been queued for a determined amount of time. If the caller does not perform the requested action, the call is dequeued.

A method for terminating a queued call from a caller to a subscriber line is also provided. The call is processed by an Advanced Intelligent Network having at least one cental office switch and a service control point. An intelligent peripheral is provided in electrical communication with the central office switch and the service control point. The intelligent peripheral is equipped with queuing functionality. A determination is made that the call has been queued within the intelligent peripheral for a determined amount of time. A request is placed to the caller to perform an action to remain in queue. If the caller does not perform the requested action, the call is dequeued.

In an embodiment of the present invention, the method further includes monitoring the subscriber line to notify the SCP when the line is idle. A call is placed at the intelligent peripheral to the subscriber in response to a determination that the subscriber line is idle. Answer supervision is forwarded to the intelligent peripheral in response to the call being answered by the subscriber. The subscriber and caller are transferred and connected at the central office switch.

In another embodiment of the present invention, the method further includes monitoring call signaling to detect a termination attempt trigger. A query is launched at the SCP for receipt by the intelligent peripheral requesting the queue status of the subscriber line in response to the detected terminating attempt trigger. The call is forwarded to the intelligent peripheral to be added to the queue in response to a determination that the queue is active. The call is delivered to the subscriber and a next event list trigger is set to determine the status of the subscriber line in response to a determination that the queue is empty. The call is connected to the subscriber line in response to a determination that the line is idle. The call is forwarded to the intelligent peripheral to be placed in queue in response to a determination that the subscriber line is busy.

The above objects and other objects, features, and advantages of the present invention are readily apparent from the following detailed description of the best mode for carrying out the invention when taken in connection with the accompanying drawings.

DETAILED DESCRIPTION OF THE PREFERRED EMBODIMENT(S)

Figure 1:
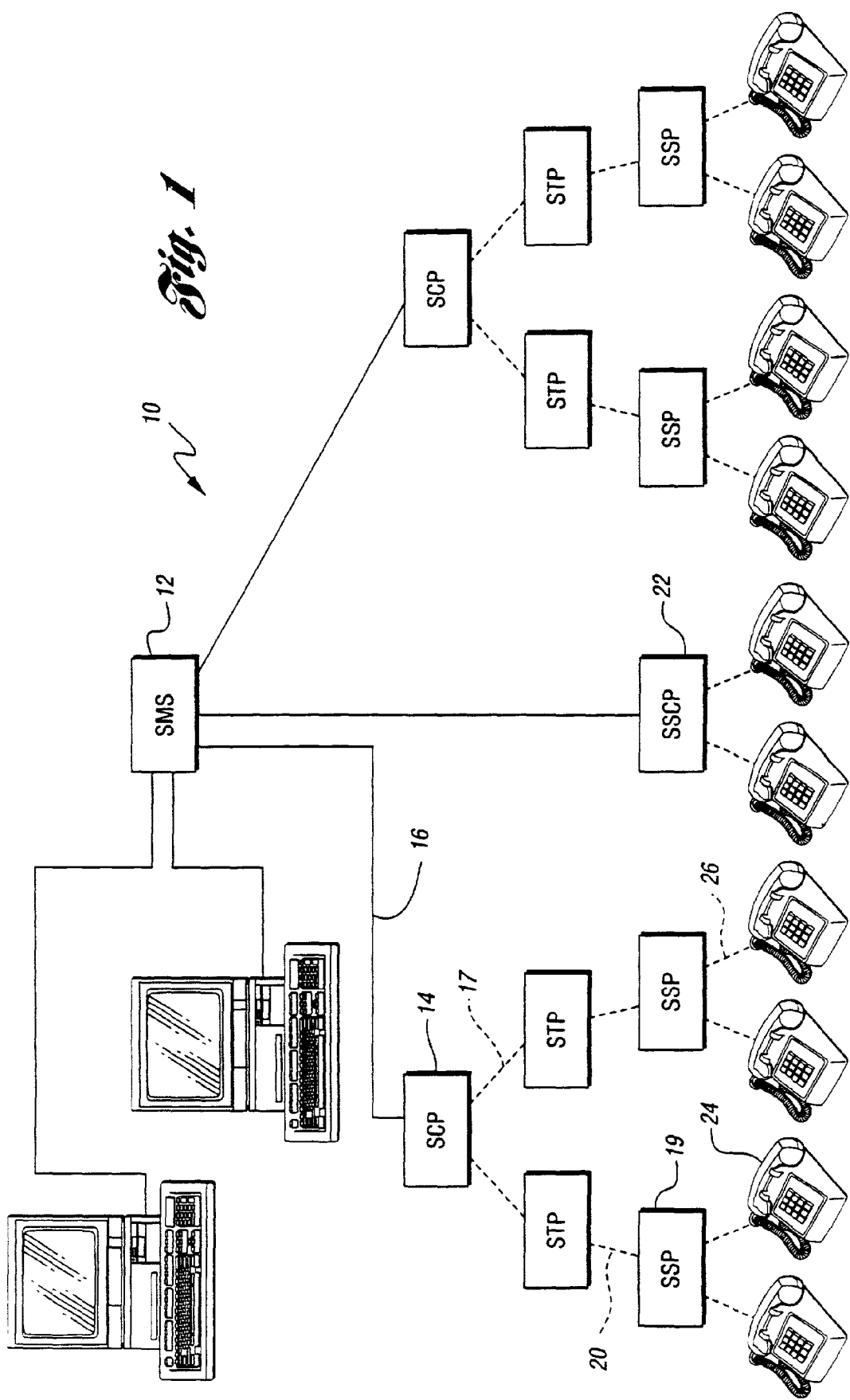
FIG. 1 is a block diagram of a representative Advanced Intelligent Network (AIN)

With reference to FIG. 1 of the drawings, a schematic diagram of a representative Advanced Intelligent Network (AIN) architecture is disclosed for use in a Public Switched Telephone Network (PSTN). The AIN architecture referred to is designated generally by reference numeral 10. As those skilled in the art will recognize, network architecture 10 is implemented with common channel Signaling System No. 7 (SS7) protocol. SS7 generally operates at 56 kbps and can support variable message lengths up to 2,176 bits (272 octets) of information per message.

As is known in the art, the SS7 network may be comprised of various package switching elements and transmission links, some of which are shown. As seen, there is also provided service management system (SMS) 12 which generally comprises a computer-based system used to design service logic, to control logic implementation to the network, and to manage the network operation, such as monitoring traffic levels and collecting statistics and billing data. SMS 12 is provided in electrical communication with a plurality of service control points (SCPs)/adjuncts 14 via wide area network management links 16. Again, as those skilled in the art will recognize, AIN service control points 14 are nodes which contain the service logic and associated data support to execute the required customer services.

Still further, there is provided signal transfer points (STPs) 18 in electrical communication with SCP/adjunct 14 via signaling links 17. Service transfer points 18 are packet switches used to route signaling messages within the network. Service switching points (SSPs) 19 are also provided. Service switching points 19 are generally nodes, usually the subscriber local switch or central office switch, which recognize the triggers generated when a subscriber's service invokes an intelligent network trigger and then communicates with the SCP to operate the service.

As shown, service switching points 19 are provided in electrical communication with signal transfer points 18 via signaling links 20. In limited traffic situations, service switching and control points (SSCPs) 22 may also be provided for combining the functions of the SCP and SSP. Subscribers 24 have at least one customer premises equipment (CPE) device such as a telephone, facsimile machine, voice messaging peripheral, modem, or the like. As shown, CPE devices 24 are provided in electrical communication with service switching points 19 (COS) via telephone lines 26.

The AIN architecture referred to above is known to permit services to be extended throughout the network. In operation, new services are typically installed on two SCP processing platforms for directly servicing a selected market. In operation, this service management system extends management and control to the remote service control points/adjuncts via a signaling network.

Figure 2:
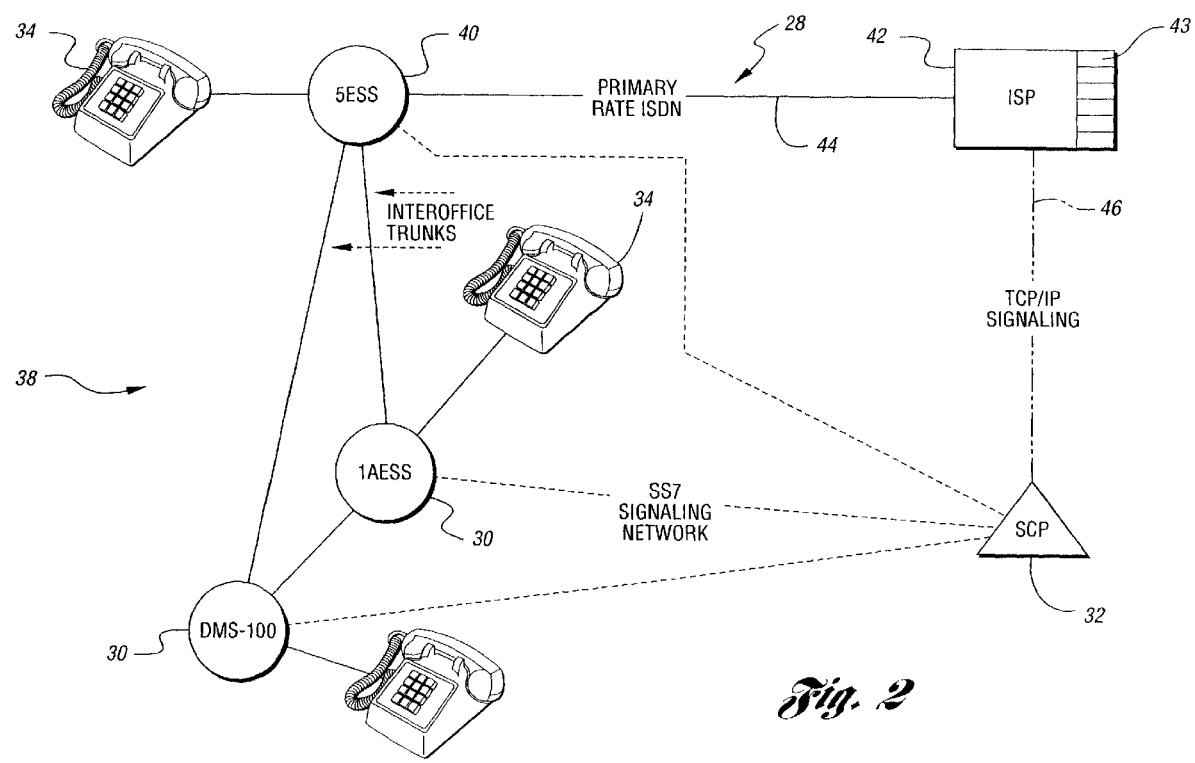
FIG. 2 is a block diagram of a telephone routing system operative to carry out the method of the present invention.

Turning now to FIG. 2, there is shown a schematic diagram of a system used to implement the method of the present invention. The system, which is designated generally by reference numeral 28, includes at least one subscriber switch 30 which is provided in electrical communication with at least one service control point 32 and at least one, preferably a plurality, of subscribers 34 so as to define an Advanced Intelligent Network 38. The Advanced Intelligent Network is equipped with Terminating Attempt Trigger and terminating Next Event List functionality, the operation of which is well known to those skilled in the art and therefore need not be discussed here in further detail.

One of the switches 40 in system 28 may be designated as a host central office switch by virtue of the fact that it is provided in electrical communication with an intelligent peripheral (IP) 42 implementing one or more queues 43. The intelligent peripheral 42 is preferably, but not necessarily, a Bellcore Intelligent Services Peripheral which is provided in electrical communication with the host central office switch 40 via Primary Rate Integrated Services Digital Network (ISDN) links 44 and further provided in electrical communication with SCP 32 via TCP/IP (wide area network) signaling 46. In further keeping with the invention, each of the subscribers 34 maintains a dedicated and preferably, but not necessarily, subscriber programmable number of queuing slots within intelligent peripheral 42.

Figure 3:
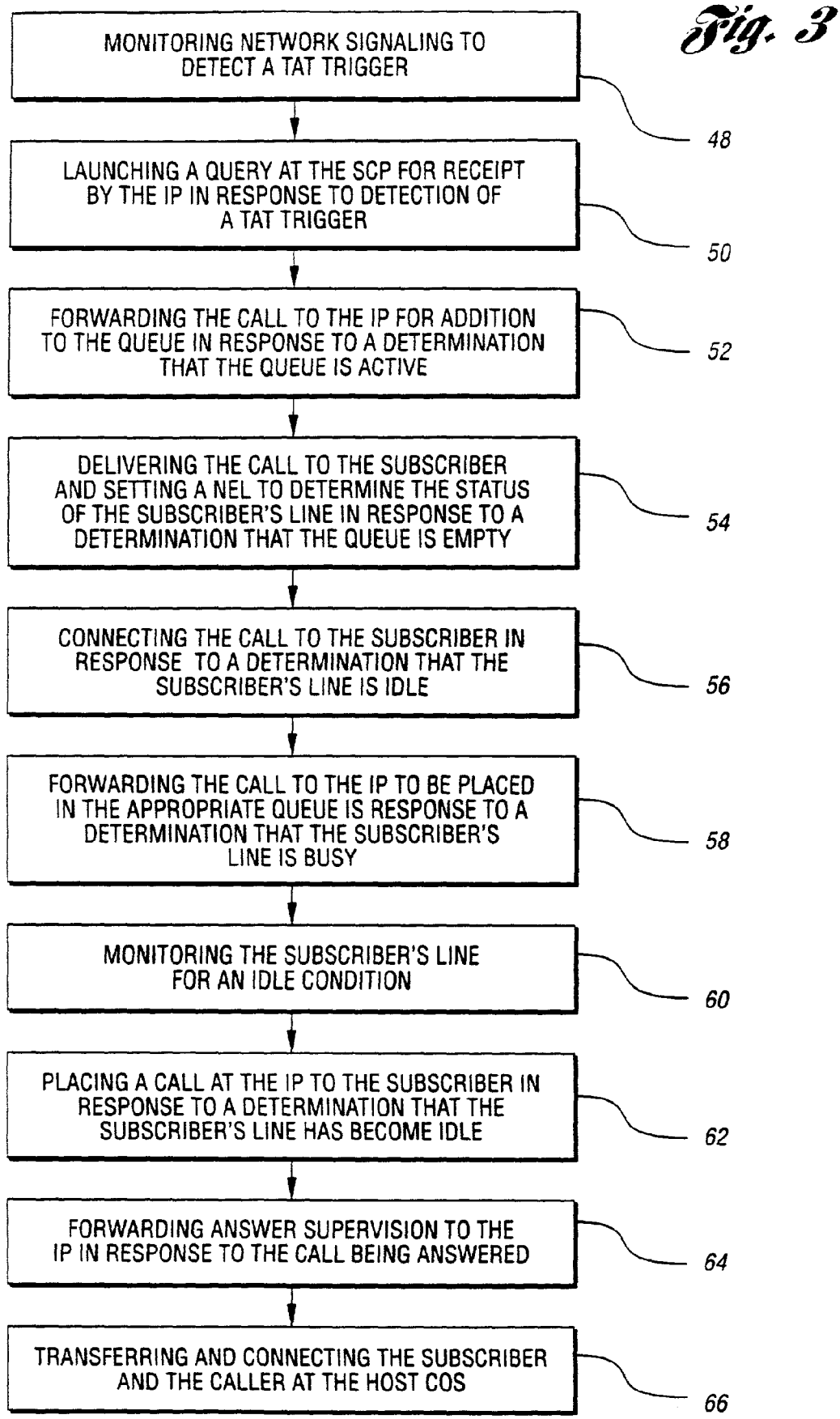
FIG. 3 is a block diagram illustrating the method steps of queuing and connecting a caller and a subscriber according to an embodiment of the present invention.
Figure 4:
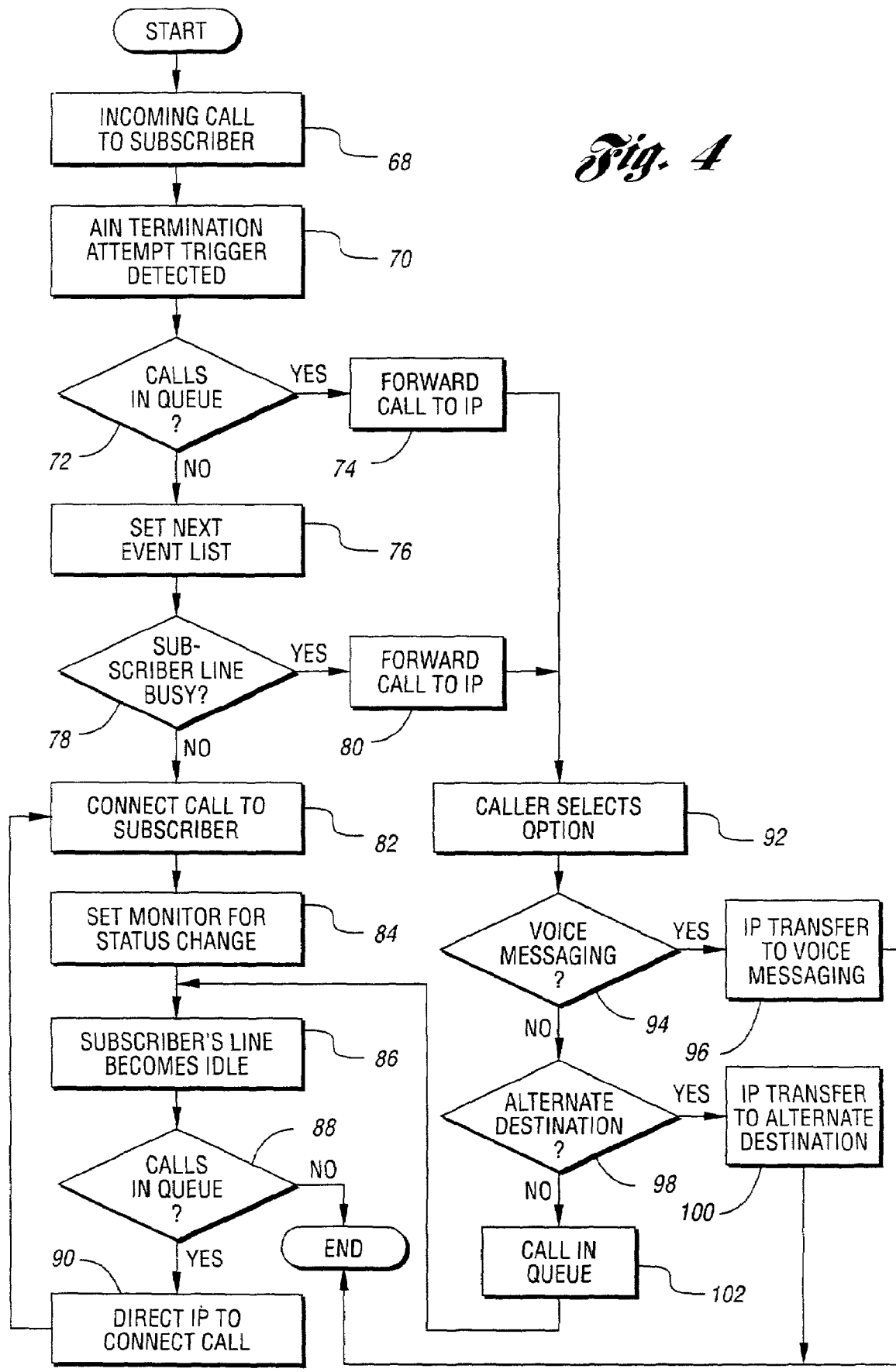
FIG. 4 is a detailed flow diagram illustrating a method for queuing and servicing calls to a subscriber line according to an embodiment of the present invention.
Figure 5:
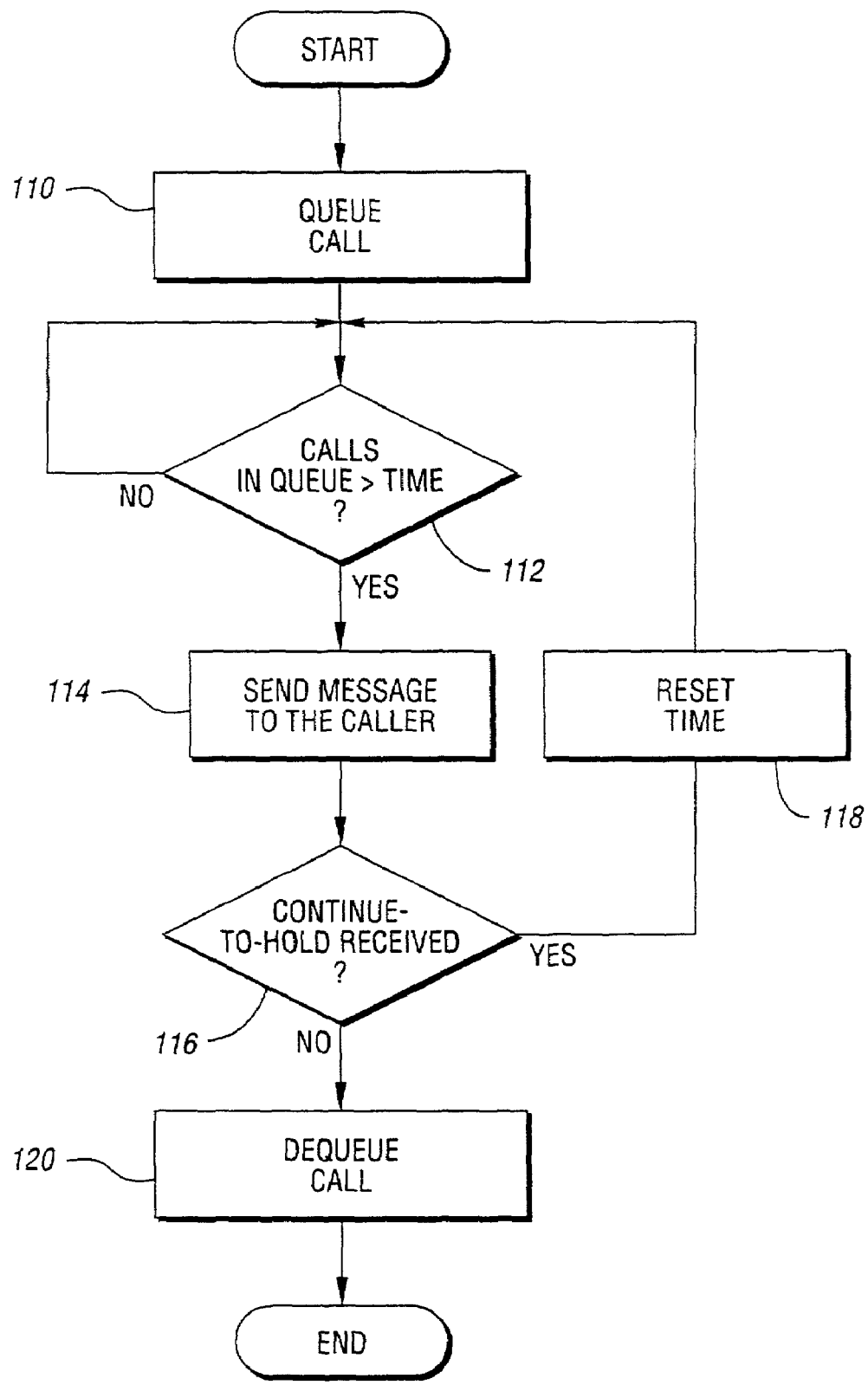
FIG. 5 is a flow diagram illustrating time-based dequeuing according to an embodiment of the present invention.

Referring to FIGS. 3–5, diagrams illustrating call queuing service termination according to embodiments of the present invention are shown. As will be appreciated by one of ordinary skill in the art, the operations illustrated are not necessarily sequential operations. The order of steps may be modified within the spirit and scope of the present invention and the order shown here is for logical presentation. Also, methods illustrated may be implemented by any combination of hardware, software, firmware, and the like, at one location or distributed. The present invention transcends any particular implementation and the embodiments are shown in sequential flow chart form for ease of illustration.

As discussed above, the method may be implemented in an Advanced Intelligent Network, such as that illustrated in system 28 of FIG. 2, which is equipped with Terminating Attempt Trigger (TAT) and Next Event List (NEL) functionality. Queuing system 28 includes intelligent processor 42 equipped with queuing functionality to provide a platform for the present invention.

In operation, network signaling is monitored 48 for detection of a TAT trigger. Upon detection of a TAT trigger, a query is launched 50 at the SCP. The query is launched in response to the detected TAT trigger and is operative to request the queue status of the subscriber line. If, in response to the SCP query, the queue is determined to be active, the call is forwarded 52 to the IP for addition to the queue. In contrast, if the queue is determined to be empty, the call is delivered 54 to the subscriber and a NEL is set to determine the status of the subscriber line. Of course, if the subscriber line is idle, the call will be connected 56 to the subscriber. Alternatively, if it is determined that the subscriber line is busy, the call will be forwarded 58 to the IP to be placed in the appropriate queue.

The subscriber line is thereafter monitored for an idle condition. If an idle condition is detected, a call is placed from the IP to the subscriber. Upon being answered, answer supervision is forwarded to the IP whereupon the subscriber is connected to the IP and an announcement is played telling the subscriber the number of calls currently stacked (waiting) in queue. The call is then transferred at the host COS where the caller and subscriber are connected.

The above described method may be further understood by reference to the detailed flow diagram of FIG. 4. As shown in block 68, the network attempts to deliver a call to the subscriber. As part of call processing, the network encounters a Termination Attempt Trigger (TAT), as shown in block 70. A check is made at block 72 to determine if the subscriber already has other calls in queue. If there are calls already in queue, the network is directed to forward this call to the IP for further processing, as shown in block 74. If there are no calls in queue, the network is directed to set the Next Event List, as shown in block 76, and attempt to connect to the subscriber line.

If the subscriber line is busy, as shown in block 78, the next event list processing directs the network to forward the call to the IP, as shown in block 80. If the subscriber line is not busy, the network will connect the call to the subscriber, as shown in block 82, and set a monitor on the subscriber line to report when it is idle, as shown in block 84. When the call is completed and the subscriber line becomes idle, as shown in block 86, the network checks to see if there are any calls left in queue, as shown in block 88. If there are no calls in queue for the subscriber, this process ends. If there are other calls in queue, the IP is directed to deliver the call from the queue to the subscriber, as shown in block 90. The process continues from block 82 and repeats as previously described.

Calls that are forwarded to the IP as shown in blocks 74 and 80 are connected and the caller is given a choice of treatments, as shown in block 92. If the caller elects to leave a message, as shown in block 94, the IP forwards the call to a messaging system, as shown in block 96. If the caller elects an alternate destination, as shown in block 98, then the IP forwards the call to that telephone line, as shown in block 100. The caller then can elect to disconnect or to be placed in queue and hold waiting for the subscriber line to become idle, as shown in block 102. Once the subscriber line becomes idle, the process continues from block 86 as previously described.

Thereafter, answer supervision is forwarded to the IP, the subscriber is connected to the IP and an announcement is played telling the subscriber the number of calls currently stacked (waiting in queue). The call is then transferred at the host COS where the caller and subscriber are connected.

Various enhancements and modifications of the above-described method are, of course, contemplated. For example, when a caller attempts to call a subscriber and all lines are busy, the IP may be programmed to state a listed directory name, if recorded, and/or an announcement indicating that all lines are busy. The caller may then be placed into queue and allowed to exit by pressing a designated number such as, for example, "1" on the caller touch tone phone to leave a message, if the subscriber has a messaging number associated with their service. As part of the invention, the IP will then attempt to complete the call and, if successful, the service will end the query and allow the caller and subscriber to maintain their voice connection until terminated by one of the parties.

In the event that the lines are still busy, the caller will remain in queue at the IP. Announcements may, of course, be placed to the caller, indicating that the lines are still busy. The caller will then be provided with the option to exit and leave a message, if the subscriber has a messaging number. Additional calls that are routed to the IP on a busy condition will be placed in order behind existing calls in queue. If a subscriber has a messaging number and the caller presses "1", for example, on a touch tone phone, the caller will be transferred directly to the subscriber messaging service. Once the caller is transferred to the voice messaging system, the call is complete and the IP will allow the caller to remain connected until the call is terminated by the caller or the messaging system or service. The caller can, of course, hang up on the telephone at any time to disconnect the call.

Other anticipated enhancements include subscriber controlled queue slot sizing, music on hold, subscriber recorded announcements, priority queuing, MIS reports which provide the subscriber an indication of how many calls are on hold and how long they are waiting by hour, as well as an indicator tone or visual indication which will alert the subscriber that there are calls holding at the IP.

Referring to FIG. 5, a flow diagram illustrating time-based dequeuing according to an embodiment of the present invention is shown. A call is queued in block 110. As described above, calls destined for subscriber 24 are queued within the communications system 28. A check is made to determine if the call has been queued more than a specified time in block 112. This check may be made, for example, by polling the queued calls periodically to determine if any calls have exceeded the specified time. Alternatively, an interrupt may be generated in response to the expiration of time associated with a particular call. The length of time may be determined by one or more of a variety of factors. For example, the time value may be preset. The determined time may also be varied based on one or more factors such as the number of calls in the queue or the time of day. Information about the queued call may also be used to establish the wait time. For example, queued numbers recognized as being from previous callers or preferred customers may be treated differently. Also, the geographic location associated with the calling number may be used to determine the wait time.

If the call has not been serviced or the call disconnected by the determined time, a message is sent to the caller in block 114. Preferably, this message is an audio message asking the caller if they wish to continue holding. A check is made in block 116 to determine if the caller wishes to continue holding. A negative response may be determined by one or more of a variety of actions or inaction. For example, if the caller does not respond within a preset amount of time, it is assumed that the caller no longer wishes to hold. The caller may be given an option to disconnect, transfer to another line or leave a message through one or more depressions of telephone keys, a spoken response, or the like. Also, if a response other than an affirmative response is received, a negative response may be assumed. Positive responses may include one or more depressions of telephone keys, a spoken response, or the like. If an affirmative response is received, the wait time is reset in block 118. The check to see if wait time is exceeded, as in block 112, is then repeated. The determined wait time may also be based on one or more affirmatively received responses to the request that the caller perform an action to remain in queue.

If a negative response is received to a request to remain on hold, the call is dequeued in block 120. Several options for handling dequeued calls are available. First, the call could be routed to a messaging system within telecommunications network 28. As is known in the art, the messaging system may be built into intelligent peripheral 42 queuing calls for subscriber 24. The messaging system may also be built into another ISP 42 or other network elements such as SSP 19, SCP 14, or the like. Information such as the calling number and, if permissible, caller identification information, may be recorded automatically on the message. Thus, if a time-out occurs before the caller performs the requested action to remain in queue, a record of the call can be preserved. Another option for dequeuing the call is to simply terminate the call. Yet another option is to transfer the caller to another line. Any option may be made available for selection by the caller. The option used may be based on the type of negative response received, the caller number, load conditions, and the like.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for terminating a queued call from a caller to a subscriber line, the call processed by an Advanced Intelligent Network (AIN) having at least one cental office switch and a service control point (SCP) in electrical communication with a plurality of subscriber switches via a signaling network, the method comprising:
   providing an intelligent peripheral in electrical communication with the at least one cental office switch and the SCP, the intelligent peripheral equipped with queuing functionality;
   determining that the call has been queued within the intelligent peripheral for a determined amount of time;
   requesting that the caller perform an action to remain in queue;
   if the caller does not perform the requested action, dequeuing the call;
   monitoring call signaling to detect a terminating attempt trigger;
   launching a query at the SCP for receipt by the intelligent peripheral requesting the queue status of the subscriber line in response to the detected terminating attempt trigger;
   forwarding the call to the intelligent peripheral to be added to the queue in response to a determination that the queue is active;
   delivering the call to the subscriber line and setting a next event list trigger to determine the status of the subscriber line in response to a determination that the queue is empty;
   connecting the call to the subscriber line in response to a determination that the line is idle; and
   forwarding the call to the intelligent peripheral to be placed in queue in response to a determination that the subscriber line is busy.

2. For use in an Advanced Intelligent Network (AIN) equipped with terminating attempt trigger (TAT) capability, the AIN having at least one central office switch and a service control point (SCP) in electrical communication with a plurality of subscriber switches via a signaling network, a method of terminating queuing of a telephone call from a caller to a subscriber telephone line comprising:
   providing an intelligent peripheral in electrical communication with the central office switch and the SCP, the intelligent peripheral equipped with queuing functionality for each of a plurality of subscribers;
   monitoring signaling to detect a TAT trigger;
   generating a first electrical signal for receipt by the SCP in response to the detected TAT trigger;
   generating a second electrical signal at the SCP for receipt by the intelligent peripheral requesting status of a queue associated with the subscriber line;
   generating a third electrical signal at the SCP for receipt by the subscriber switch instructing the subscriber switch to forward the call to the intelligent peripheral to be added to the queue in response to a determination that the queue is active;
   determining that the call has been queued in the intelligent peripheral for a determined amount of time;
   requesting that the caller perform an action to remain in queue; and
   if the caller does not perform the requested action, dequeuing the call.

3. The method of claim 2 wherein the AIN is further equipped with Next Event List (NEL) functionality, the method further comprising:
   generating a fourth electrical signal at the SCP for receipt by the subscriber switch instructing the subscriber switch to deliver the call to the subscriber line and to set a NEL to determine the status of the subscriber line in response to a determination that the queue is empty; and
   connecting the call to the subscriber line in response to a determination that the subscriber line is idle.

4. The method of claim 2 further comprising:
   generating a fifth electrical signal at the subscriber switch for receipt by the SCP in response to a determination that the subscriber line is busy;
   generating a sixth electrical signal at the SCP for receipt by the subscriber switch instructing the subscriber switch to forward the call to the intelligent peripheral to be placed in the queue;
   generating a seventh electrical signal at the SCP for receipt by the subscriber switch instructing the subscriber switch to set a monitor on the subscriber line and to notify the SCP when the line is idle;

generating an eighth electrical signal at the subscriber switch for receipt by the SCP in response to a determination that the subscriber line is idle;

generating a ninth electrical signal at the SCP for receipt by the intelligent peripheral instructing the intelligent peripheral to call the subscriber line via the central office switch;

generating a tenth electrical signal at the central office switch for receipt by the intelligent peripheral to forward answer supervision to the intelligent peripheral in response to the call being answered by the subscriber; and generating an eleventh electrical signal at the intelligent peripheral for receipt by the central office switch to transfer and connect the subscriber and the caller at the central office switch.

* * * * *